US008335609B2

(12) United States Patent
Beacham et al.

(10) Patent No.: US 8,335,609 B2
(45) Date of Patent: Dec. 18, 2012

(54) METHOD AND SYSTEM FOR EXPOSING AND RECORDING EMBEDDED AVIONICS DATA

(75) Inventors: William H. Beacham, Enfield, CT (US); Jason E. Posniak, Broad Brook, CT (US); James E. Baker, Farmington, CT (US); Paul Raymond Scheid, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 375 days.

(21) Appl. No.: 12/692,711

(22) Filed: Jan. 25, 2010

(65) Prior Publication Data

US 2011/0184607 A1 Jul. 28, 2011

(51) Int. Cl.
*G06F 7/00* (2006.01)

(52) U.S. Cl. ...................................................... 701/33.4

(58) Field of Classification Search .................. 701/33.4
See application file for complete search history.

(56) References Cited

U.S. PATENT DOCUMENTS

| | | | | |
|---|---|---|---|---|
| 4,682,292 | A | 7/1987 | Bue et al. | |
| 5,167,020 | A | 11/1992 | Kahn et al. | |
| 5,184,312 | A | 2/1993 | Ellis | |
| 5,303,142 | A | 4/1994 | Parsons et al. | |
| 5,424,949 | A * | 6/1995 | Applegate et al. | 701/14 |
| 5,805,828 | A | 9/1998 | Lee et al. | |
| 5,864,687 | A * | 1/1999 | Baker et al. | 710/305 |
| 6,003,146 | A | 12/1999 | Beutler | |
| 6,278,913 | B1 | 8/2001 | Jiang | |
| 6,289,024 | B1 | 9/2001 | Toillon | |
| 6,360,290 | B1 | 3/2002 | Avritch et al. | |
| 7,167,788 | B2 | 1/2007 | Loda et al. | |
| 2006/0142914 | A1 | 6/2006 | Yokogawa | |
| 2007/0164166 | A1 * | 7/2007 | Hirvonen | 244/175 |
| 2008/0119968 | A1 * | 5/2008 | Loda | 701/3 |
| 2009/0023432 | A1 * | 1/2009 | MacInnis et al. | 455/418 |
| 2010/0082547 | A1 * | 4/2010 | Mace et al. | 707/648 |

FOREIGN PATENT DOCUMENTS

| | | |
|---|---|---|
| EP | 1494149 | 1/2005 |
| FR | 2917201 | 12/2008 |

OTHER PUBLICATIONS

European Search Report dated May 24, 2011.

* cited by examiner

*Primary Examiner* — Mary Cheung
*Assistant Examiner* — Michael D Lang
(74) *Attorney, Agent, or Firm* — Carlson, Gaskey & Olds, P.C.

(57) ABSTRACT

A method of exposing and recording embedded avionics data using dynamically assigned labels assigns a first plurality of data labels to aircraft controller parameters designated for at least one aircraft sub-controller. A second plurality of data labels are dynamically assigned to desired embedded parameters of an aircraft main controller. At least one data word storing one of the desired embedded parameters is created. The at least one data word has one of the second plurality of data labels. The at least one data word is exposed by transmitting the at least one data word to a selective recording device. The selective recording device records the at least one data word.

28 Claims, 4 Drawing Sheets

METHOD AND SYSTEM FOR EXPOSING AND RECORDING EMBEDDED AVIONICS DATA

BACKGROUND OF THE INVENTION

This disclosure relates to embedded avionics data, and more particularly to a method and system for exposing and recording embedded avionics data.

The United States Federal Aviation Administration ("FAA") uses the DO-178B specification as a guideline to analyze and certify the reliability of avionics software. The DO-178B specification defines five levels of software, A, B, C, D and E. The level of criticality of the software varies such that Level A software is the highest criticality, and level E software is the lowest criticality. Level A software requires extensive testing and verification to ensure reliability under all operational conditions. Level A software is deterministic, in that data is repetitively and regularly transmitted at pre-defined intervals to meet the requirements of the receiving end systems.

ARINC 429 is a serial data stream format that may be used in systems employing Level A software. Aircraft main controllers, such as an electronic engine control ("EEC"), use the ARINC 429 standard to communicate data along a data bus to aircraft sub-controllers, such as a flight control or flight deck equipment.

SUMMARY

A method of exposing and recording embedded avionics data using dynamically assigned labels assigns a first plurality of data labels to aircraft controller parameters designated for at least one aircraft sub-controller. A second plurality of data labels are dynamically assigned to desired embedded parameters of an aircraft main controller that are not otherwise visible. At least one data word storing one of the desired embedded parameters is created. The at least one data word has one of the second plurality of data labels. The at least one data word is exposed by transmitting the at least one data word to a selective recording device. The selective recording device records the at least one data word. A system for performing the method is also disclosed.

These and other features of the present invention can be best understood from the following specification and drawings, the following of which is a brief description.

DETAILED DESCRIPTION

Figure 1:
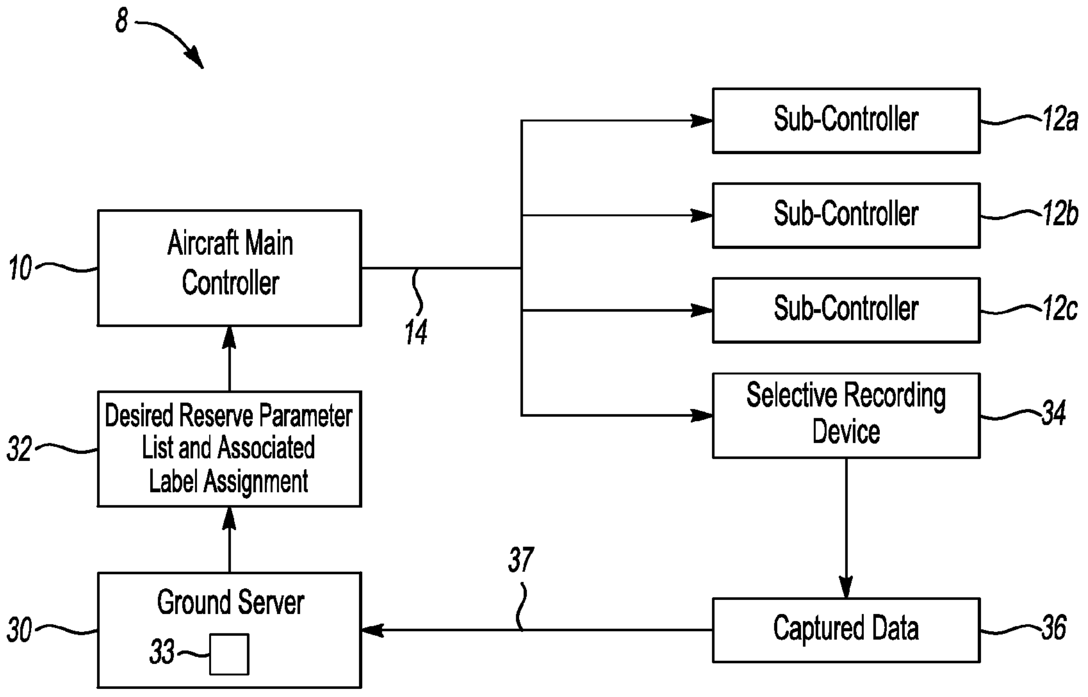
FIG. 1 schematically illustrates a system for exposing and recording embedded avionics data using dynamically assigned labels.

FIG. 1 schematically illustrates a system 8 for exposing and recording embedded avionics data using parameters dynamically assigned to transmitted labels. An Aircraft Main Controller 10 transmits data along data bus 14 to a plurality of aircraft sub-controllers 12*a-c* and a selective recording device 34. The term "embedded data" refers to data that is stored within a device (e.g. the aircraft main controller 10) but that is not otherwise accessible, whereas non-embedded data refers to readily accessible data (e.g. data routinely transmitted by the main controller 10 to aircraft sub-controllers 12*a-c*). Some example aircraft sub-controllers 12*a-c* may include a flight control computer, a crash recorder computer ("black box") or an environmental control computer. The selective recording device 34 may be a Flight-data Acquisition, Storage and Transmission computer ("FAST box"), for example. Of course, other listening devices could be used instead of a FAST box. Also, although only a single bus 14 is labeled, it is understood that reference numeral 14 could refer to a plurality of busses.

The controller 10 transmits data words along bus 14, with each data word being identified by a label. A first plurality of labels is used for data intended for the aircraft sub-controllers 12*a-c*. A second plurality of labels is used for data including the desired embedded parameters. The selective recording device 34 is configured to record data words including one of the second plurality of labels, and the aircraft sub-controllers 12*a-c* are configured to ignore data words from the second plurality of labels. The selective recording device 34 differs from a known "black box" in that the selective recording device 34 is operable to record otherwise embedded data, whereas a "black box" only records non-embedded data.

A ground server 30 transmits a desired embedded parameter list and associated label assignment 32 to the aircraft main controller 10. The desired embedded parameter list includes a plurality of embedded parameters for which controller 10 data is desired, and includes a label assignment designating one of the second plurality of data labels to each of the plurality of desired embedded parameters. The controller 10 stores the embedded data parameters in data words having the one of the second plurality of labels, and transmits the data words to the selective recording device 34 over the bus 14. Thus, by transmitting the data words to the selective recording device 34, and by storing those data words in the selective recording device 34, the system 8 is able to expose and store embedded avionics data.

Figure 2:
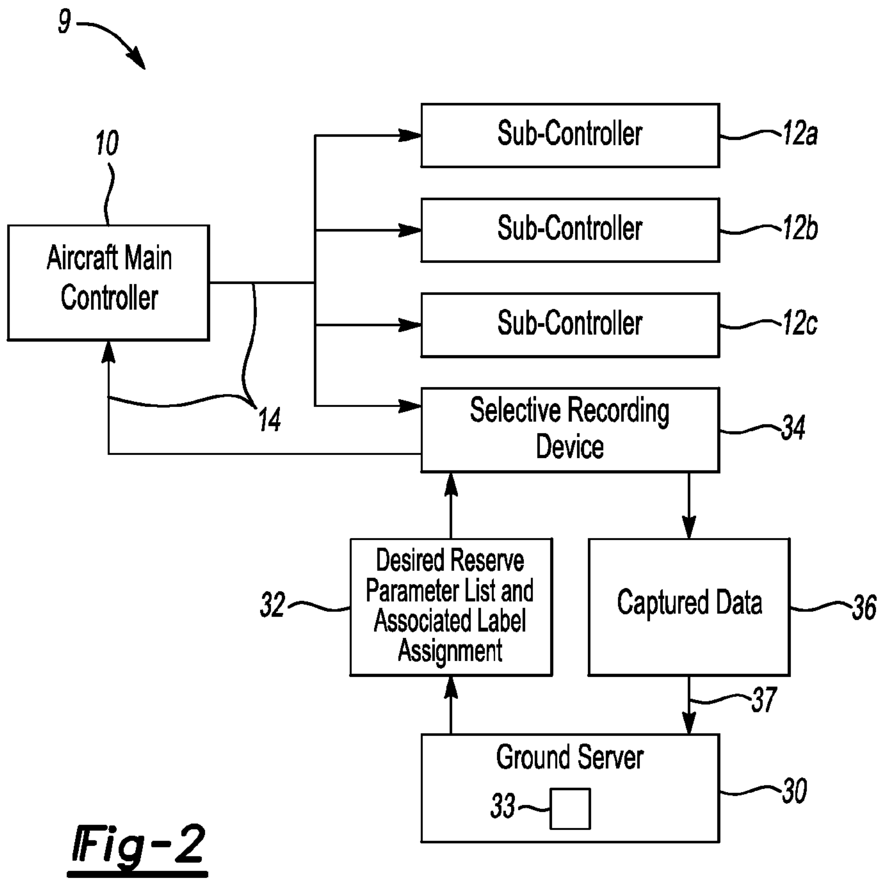
FIG. 2 schematically illustrates another embodiment of the system of FIG. 1.

After the flight, or during the flight, the captured data 36, which includes the desired embedded parameters from the Aircraft Main Controller 10, may be transmitted to the ground server 30 for analysis. FIG. 2 illustrates a system 9 in which the selective recording device 34 is used to receive the desired embedded parameter list and associated label assignment 32 and is used to transmit captured data 36 via a connection 37 that may be wireless (e.g. data can be transmitted during flight), may be wired (e.g. hard wired connection), or may be represent a removable data storage unit (e.g. USB device that could be inserted into the selective recording device 34 to download or upload data). In the configuration of system 9, the selective recording device 34 is also used to forward the parameter list and label assignment to the aircraft main controller 10.

Figure 3:
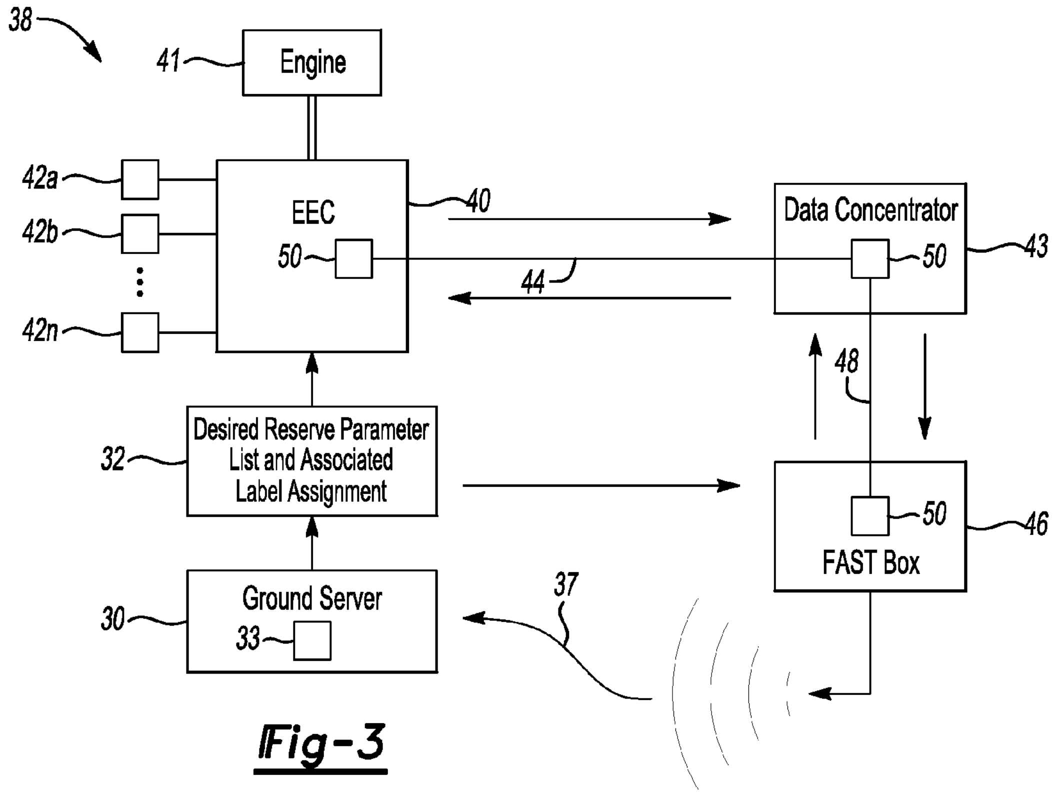
FIG. 3 schematically illustrates an example implementation of the system of FIG. 1.

In one example the systems 8-9 may use the ARINC 429 specification such that the transmitted data words are ARINC 429 data words, and the data bus 14 is an ARINC 429 data bus. FIG. 3 schematically illustrates an example implementation of the system 8 of FIG. 1. In the configuration 38 of FIG. 3, an EEC 40 controls an engine 41, and is in communication with a plurality of sensors 42*a-n*. The sensors 42 may include pressure sensors, temperature sensors, oil sensors, engine speed sensors, or feedback sensors, for example. The feedback sensors may detect positions of various valves (e.g., fuel valve, oil cooler valve, etc.), positions of switches (e.g. mechanical switches, electronic switches, etc.), or may detect a torque motor valve position, for example. Thus, the captured data 36 (see FIGS. 1, 2) may include raw sensor data received by the EEC 40, or may include embedded values calculated from the raw sensor data, may include internal results of other calculations, may include non-calculated data such as table entries or data received from other aircraft systems over aircraft data busses, or may include the content of any desired memory address residing in the aircraft main controller 10 or any input/output register contained in the aircraft main controller 10.

The EEC 40 may communicate with a data concentrator 43 via a first ARINC 429 bus 44. The data concentrator 43 communicates with a FAST box 46 via a second ARINC 429 bus 48. Each of the EEC 40, data concentrator 43, and FAST box 46 are computers, and each includes an ARINC 429 input/output serial data bus module 50 operable to translate data to and from the ARINC 429 data format. Although it is understood that the EEC 40 may be configured to communicate directly with FAST box 46, the data concentrator 43 may be used as an intermediate step. The data concentrator 43 may also be operable to receive data from other sources. Although ARINC 429 is illustrated in FIG. 3, it is understood that other aircraft data bus technologies could be used (e.g., ARINC 664, AFDX, MIL-STD-1553, CAN, RS422, etc.). The FAST box 46 is operable to wirelessly transmit data to the ground server 30 during or after a flight.

Figure 3A:
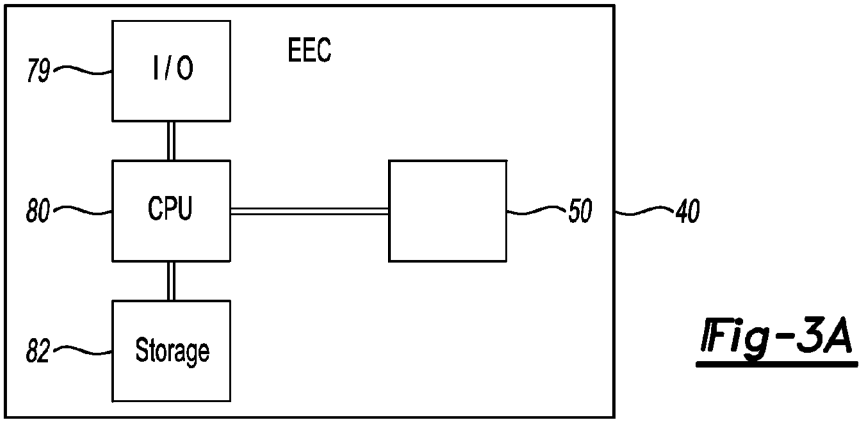
FIG. 3*a* schematically illustrates an electronic engine control of FIG. 3 in greater detail.

FIG. 3*a* schematically illustrates an electronic engine control of FIG. 3 in greater detail. As shown in FIG. 3*a*, the EEC includes a CPU 80, storage 82, such as a hard drive or other electronic, optical, magnetic or other mass storage, includes at least one input/output ("I/O") device 79, such as a sensor, motor, relay, lamp, digital data bus, and includes the ARINC 429 input/output ("I/O") module 50. Similarly, the data concentrator 43 and FAST box 46 would include a CPU and storage, as they are also computers.

Figure 4:
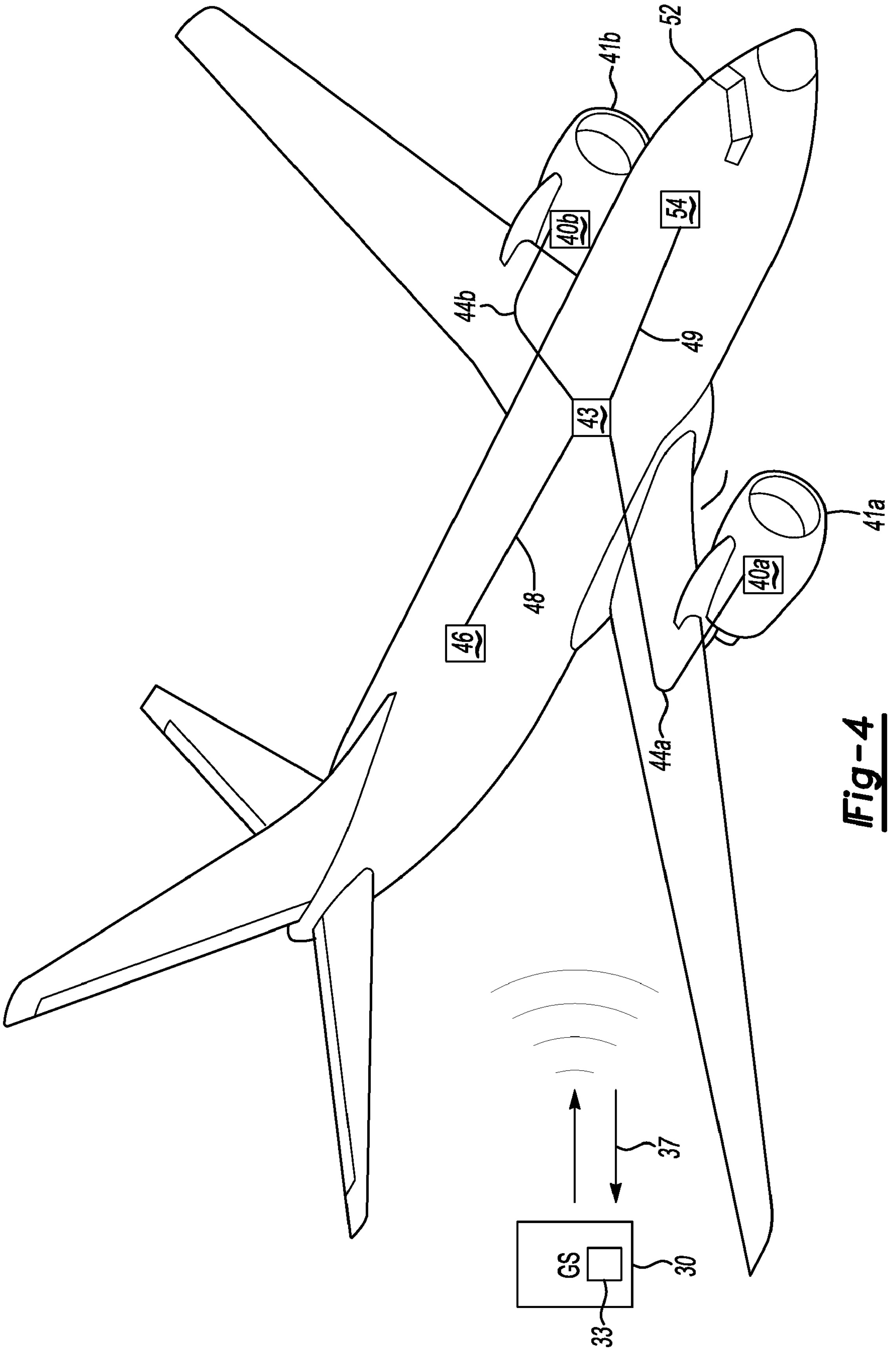
FIG. 4 illustrates the implementation of FIG. 3 within an environment of an aircraft including a plurality of gas turbine engines.

FIG. 4 illustrates the configuration 38 of FIG. 3 within an environment of an aircraft 52 including a plurality of gas turbine engines 41*a-b*. In one example the engines 41*a-b* are geared turbo fan engines. Of course, other gas turbine engines could be used. A first electronic engine control ("EEC") 40*a* controls engine 41*a*, and a second EEC 40*b* controls engine 41*b*. Although only two engines 41*a-b* and two EECs 40*a-b* are shown, it is understood that FIG. 4 is just an example, and that other quantities of engines and EECs could be used. The EECs 40*a-b* communicate with data concentrator 43 via ARINC 429 busses 44*a-b*. The data concentrator 43 is in communication with FAST box 46 and other aircraft systems 54 via ARINC 429 busses 48 and 49. The other aircraft systems 54 could include, for example, flight controls, electric systems, an auxiliary power unit, etc.

Figure 5:
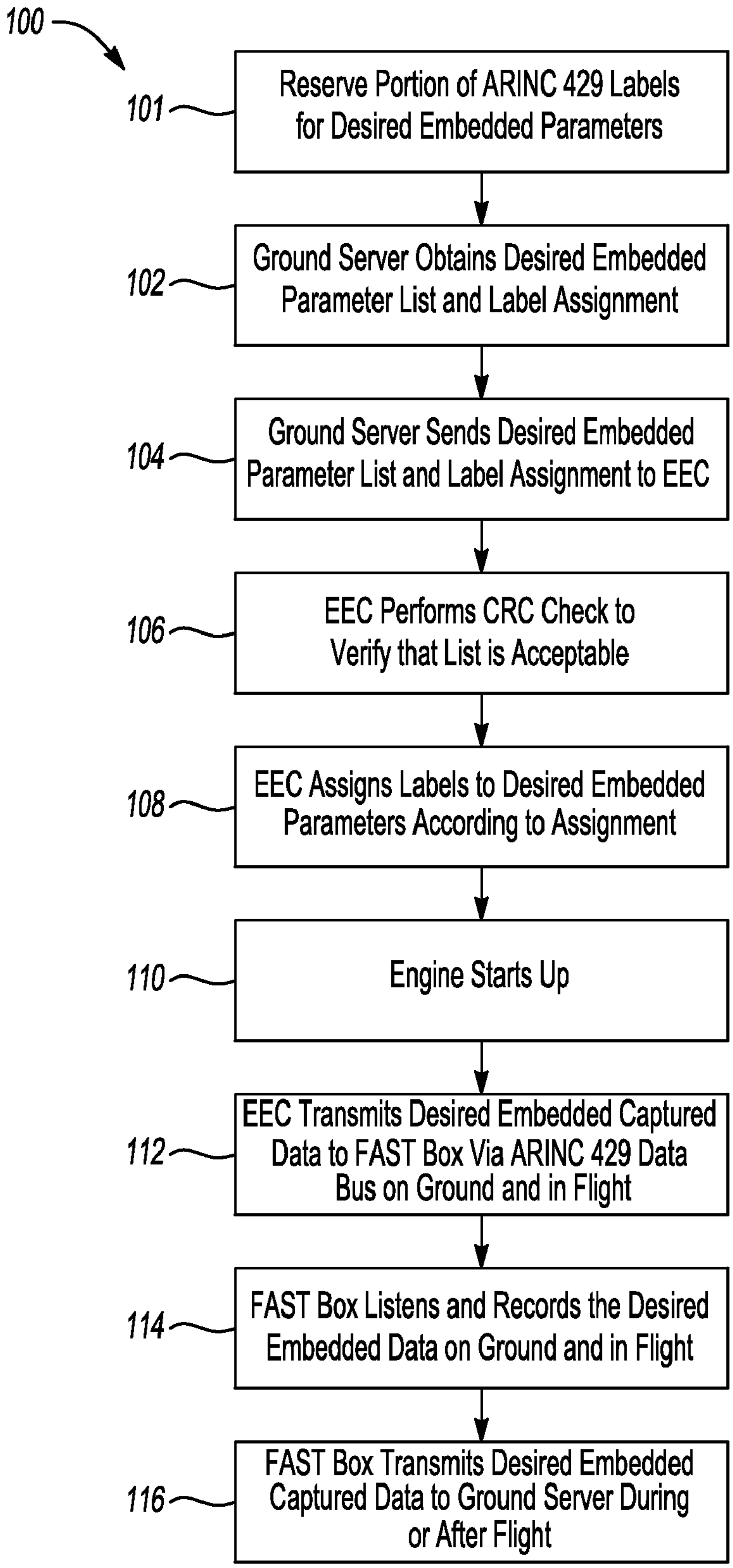
FIG. 5 schematically illustrates a method of exposing and recording embedded avionics data using dynamically assigned labels.

FIG. 5 schematically illustrates a method 100 of exposing and recording embedded avionics data using dynamically assigned labels. A plurality of ARINC 429 data labels are reserved for desired embedded parameters (step 101). In ARINC 429, there are $2^8$ or 256 possible labels for each individual bus, a portion of which (first plurality of labels) are used by other aircraft sub-controllers 12*a-c*, and a portion of which (second plurality of labels) that are typically not used by the other aircraft sub-controllers 12*a-c*. In the method 100, a portion of those labels (the second plurality of labels, in one example 20 of the 256 labels) are reserved in step 101. Of course, the method 100 could be expanded to include a plurality of data busses such that the number of available labels could be increased.

The ground server 30 obtains a desired embedded parameter list and an associated label assignment 32 (step 102). The label assignment includes a plurality of labels (from the second plurality of labels) to assign to the desired embedded parameters. In one example the label assignment may be generated by a known server card 33 (see FIGS. 1-2). Of course, it is understood that the server card 33 would not be required, and that a label assignment could be generated by a ground server 30 lacking the server card 33. The label assignment could also be created by an individual with the proper skills, and could then be loaded onto the ground server 30.

The ground server 30 transmits the desired embedded parameter list and associated label assignment 32 to the EEC 40 (step 104). In one example, the ground server 30 transmits the desired embedded parameter list and associated label assignment 32 directly to the EEC 40 (see the configuration of FIG. 1). In another example, the ground server 30 transmits the desired embedded parameter list and associated label assignment 32 to the EEC 40 via a sub-controller 12 or the selective recording device 34 (see the configuration of FIG. 2).

The EEC 40 may optionally perform a mathematical validation algorithm, such as a cyclic redundancy check ("CRC") to verify that the received desired embedded parameter list and associated label assignment 32 is valid (step 106). A CRC involves a mathematical analysis of all bits in the desired embedded parameter list and associated label assignment 32 and a comparison of a computed value to a received CRC value. If the calculated CRC value is equal to the received CRC value, the desired embedded parameter list and associated label assignment 32 is deemed to be valid. If the calculated CRC value is not equal to the received CRC value, the parameter list and label assignment 32 is deemed to be corrupted, and the desired parameter list and label assignment 32 may be ignored. The EEC assigns the desired embedded parameters to the specified labels as defined in desired embedded parameter list and associated label assignment 32 (step 108).

Once the EEC 40 completes the assignments of the labels to the parameters, an aircraft engine may be started (step 110), and a flight may occur. It is understood by those skilled in the art that the method 100 could be extended to include the operational flight period of the aircraft main controller 10 after an appropriate safety analysis and failure accommodation was performed and accepted by a certification authority. During flight, the EEC 40 transmits captured data to FAST box 46 (step 112) over one or more ARINC 429 busses (step 112) on the ground and during flight. The captured data transmitted by the EEC 40 includes ARINC 429 data words, each data word containing a desired embedded parameter and being identified by one of the reserved, assigned labels. The ARINC 429 data words are transmitted to a selective recording device 34 (e.g. a FAST box) over the data bus 14. The FAST box 46 listens and records the data during flight (step 114), and the FAST box 46 transmits received data to a ground server 30 during or after the flight (step 116).

Of course, because ARINC 429 is deterministic, the EEC 40 would continue to transmit data words along the ARINC 429 data bus 44 at regular prescribed intervals. However, the data words containing the desired embedded parameters could be transmitted between these other regular scheduled transmissions.

Figure 6:
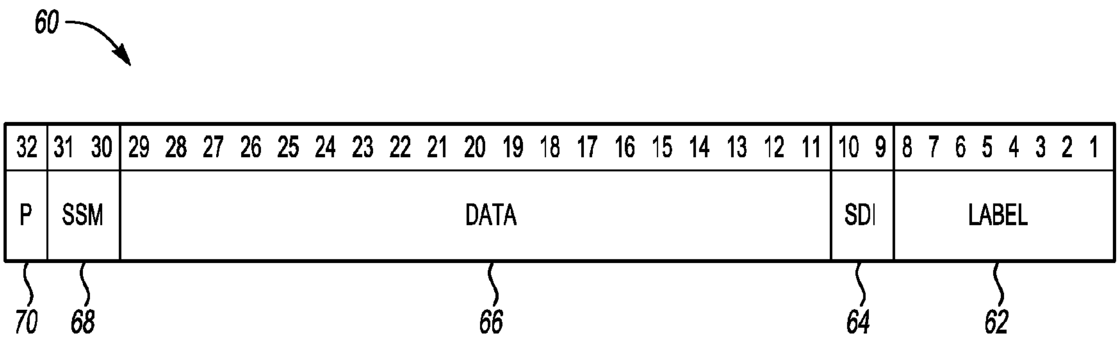
FIG. 6 schematically illustrates an example ARINC 429 data word.

FIG. 6 schematically illustrates an example ARINC 429 data word 60. As specified by the ARINC 429 specification, the data word 60 includes 32 bits. The first eight bits (bits 1-8) are a label 62 used to identify the contents of the data word 40. These first eight bits are used to store the labels from the embedded parameter list and associated label assignment 32. The next two bits (bits 9-10) are used for a source device identifier ("SDI") 64 that identifies a source of the data in the data word 60. For example, if an aircraft includes four engines and an engine speed is being transmitted in the data word 60, the SDI 64 may be used to identify which of the four engines the data word 60 is referring to.

The next 19 bits (bits 11-29) are used to store parameter data 66, such as the embedded parameters received in the desired embedded parameter list and associated label assignment 32. The next two bits (bits 30-31) are used to store a sign status matrix value 68. The sign status matrix value 68 indicates data validity, such as a failure warning, a lack of computed data, a functional test, or normal data, for example. The last bit (bit 32) is a parity bit 70 that is used to determine if the data word 40 has been properly received. The value of parity bit 70 may be set for odd parity such that parity bit 70 is set equal to "0" if a quantity of logic "1's" in the data word 60 are odd, and is set to "1" if the quantity of logic "1's" in the data word 60 is even, such that upon receipt of the data word 60 the bits may be analyzed for accuracy. Of course, the parity bit 70 could be set for an even parity bit.

Prior art EECs 40 only transmitted data the other aircraft sub-controllers 12 needed. By using reserved labels not otherwise recognized by other aircraft sub-controllers 12 with which the EEC 40 communicates, the other aircraft sub-controllers 12 simply ignore the ARINC 429 data words that include one of the reserved labels. Thus, by using the method 100 and configurations shown in FIGS. 3 and 4, one may dynamically assign labels to desired embedded parameter data and may dynamically receive that parameter data during flight of an aircraft. Since the labels are always transmitted regardless of the existence of the parameter list and label assignment 32 (without the parameter list and label assignment 32 the labels would simply have no associated data), the deterministic nature of the ARINC 429 labels on the bus is maintained.

Although the ARINC 429 standard has been described in detail, it is understood that the method 100 could be applied to other non-ARINC 429 standards such as ARINC 664 or MIL-STD-1553. Using ARINC 664 as an example, an ARINC 664 data packet can include approximately 1500 bytes, which is a far greater size than the 32 bit ARINC 429 data words. Thus, in ARINC 664, instead of applying a reserved label into a 32 bit word (which would by default always have a label), data may simply be populated into a portion of an ARINC 664 data packet that may not otherwise be populated (e.g., empty denotes not in desired embedded parameter list, populated denotes data word corresponds to desired embedded parameter list).

Additionally, although the method 100 has been described in the context of an aircraft, it is understood that non-aircraft applications would be possible. For example, the method 100 could be applied to medical equipment (e.g. MRI machines).

Although embodiments of this invention have been disclosed, a worker of ordinary skill in this art would recognize that certain modifications would come within the scope of this invention. For that reason, the following claims should be studied to determine the true scope and content of this invention.

What is claimed is:

1. A method of exposing and recording embedded avionics data using dynamically assigned labels, comprising:

assigning a first plurality of data labels to aircraft controller parameters designated for at least one aircraft sub-controller;

dynamically assigning a second plurality of data labels to desired embedded parameters of an aircraft main controller;

creating at least one data word storing one of the desired embedded parameters, the data word having one of the second plurality of data labels, wherein the desired embedded parameters are only accessible from the aircraft main controller with the at least one data word storing the desired embedded parameters and having one of the second plurality of labels;

exposing the at least one data word via transmission to a selective recording device;

recording the at least one data word using the selective recording device.

2. The method of claim 1, including:

configuring the at least one aircraft sub-controller to ignore the data words having one of the second plurality of data labels.

3. The method of claim 1, wherein the aircraft main controller is an electronic engine control, wherein the at least one data word is an ARINC 429 data word, and wherein said transmitting the at least one data word occurs over an ARINC 429 data bus.

4. The method of claim 3, wherein each of the second plurality of data labels are ARINC 429 data labels, and wherein the at least one data word is a 32-bit data word, a portion of which includes one of the ARINC 429 data labels.

5. The method of claim 3, wherein the desired embedded parameter corresponds to a value equal to or calculated in response to a value from a sensor in communication with the electronic engine control, and wherein the sensor is one of a pressure sensor, a temperature sensor, an oil sensor, an engine speed sensor or a feedback sensor.

6. The method of claim 3, wherein the desired parameter corresponds to the contents of any memory location or input/output register contained in the desired aircraft main controller.

7. The method of claim 3, wherein the ARINC 429 data word identifies a source of data in the data word using a 2-bit source device identifier.

8. The method of claim 1, wherein said dynamically assigning a second plurality of data labels to desired embedded parameters of an aircraft main controller is performed during or prior to a flight, and wherein said recording the at least one data word at a selective recording device is performed prior to the flight, during the flight, or both.

9. The method of claim 1, including:

transmitting the recorded at least one data word from the selective recording device to a ground computer via a wired connection, a wireless connection, or a data storage unit in communication with the selective recording device.

10. The method of claim 1, wherein the aircraft sub-controller includes at least one of a crash recorder computer, an environmental control computer, a flight computer, a navigation computer, a flight deck computer or a Flight-data Acquisition, Storage and Transmission computer.

11. The method of claim 1, including receiving a list including a plurality of desired embedded parameters and an assignment designating one of the second plurality of data labels to each of the plurality of desired embedded parameters; and performing a mathematical calculation on the list to ensure the accuracy of the list.

12. The method of claim 9, wherein receiving the list and the assignment is performed by the aircraft main controller.

13. The method of claim 1, including:

transmitting the dynamically assigned second plurality of data labels to a plurality of aircraft main controllers, wherein the plurality of aircraft main controllers perform said creating at least one data word storing one of the desired embedded parameters and said transmitting the at least one data word.

14. The method of claim 1, wherein the selective recording device records only the at least one data words having one of the second plurality of data labels.

15. The method of claim 1, including providing a list including a plurality of desired embedded parameters and an assignment designating one of the second plurality of data labels to each of the plurality of desired embedded parameters via the selective recording device.

16. The method of claim 1, wherein the aircraft main controller is in communication with the at least one aircraft sub-controller.

17. A system for exposing and recording embedded avionics data using dynamically assigned labels, comprising:

at least one aircraft sub-controller;

an aircraft main controller having a predefined first plurality of data labels assigned to aircraft sub-controller data, and having a second plurality of data labels dynamically assigned to desired embedded parameters, wherein the desired embedded parameters are only accessible from the aircraft main controller with the at least one data word storing the desired embedded parameters and having one of the second plurality of labels; and a selective recording device operable to expose the desired embedded parameters by selectively recording data words that include one of the second plurality of data labels, the data words being received over a data bus.

18. The system of claim 17, including:

a ground computer operable to generate an assignment designating one of the second plurality of data labels to each of the desired embedded parameters, and operable to transmit the assignment and a list of the desired embedded parameters to the aircraft main controller.

19. The system of claim 18, wherein the aircraft main controller is operable to perform a mathematical calculation on the label assignment and the embedded parameter list to ensure accuracy of the label assignment and the parameter list.

20. The method of claim 18, wherein the ground computer is operable to generate and transmit during flight.

21. The system of claim 17, the at least one aircraft sub-controller being configured to ignore data words including one of the second plurality of data labels.

22. The system of claim 17, wherein each of the second plurality of data labels are ARINC 429 data labels, wherein the selectively recorded data words are 32-bit ARINC 429 data words, a portion of which includes one of the ARINC 429 data labels, and wherein the aircraft main controller executes DO178B Level A software.

23. The system of claim 17, wherein the aircraft communication system includes a plurality of aircraft main controllers, each of the aircraft main controllers being operable to transmit data words identified by one of the second plurality of data labels and containing the desired embedded parameters.

24. The system of claim 17, wherein the desired embedded parameter corresponds to a value equal to or calculated in response to a value from a sensor in communication with the aircraft main controller, and wherein the sensor is one of a pressure sensor, a temperature sensor, an oil sensor, an engine speed sensor or a feedback sensor.

25. The system of claim 24, wherein the desired parameter corresponds to the contents of any memory location or input/output register contained in the desired aircraft main controller.

26. The method of claim 17, wherein the aircraft main controller is in communication with the at least one aircraft sub-controller.

27. A method of exposing and recording embedded avionics data using dynamically assigned labels, comprising:

dynamically assigning one of a plurality of reserved ARINC 429 data labels to a desired embedded parameter of an aircraft main controller;

transmitting the label to embedded parameter assignment to the aircraft controller; and receiving the desired embedded parameter over an ARINC 429 data bus as a portion of an ARINC 429 data word, the ARINC 429 data word being identified by the assigned label, wherein the desired embedded parameter is only accessible from the aircraft main controller with the ARINC 429 data word being identified by the assigned label.

28. The method of claim 27, wherein the ARINC 429 data word identifies a source of data in the data word using a 2-bit source device identifier.

* * * * *